US006639549B2

United States Patent
Vanderwerf et al.

(10) Patent No.: US 6,639,549 B2
(45) Date of Patent: Oct. 28, 2003

(54) FAULT DETECTION AND EXCLUSION FOR GLOBAL POSITION SYSTEMS

(75) Inventors: Kevin D. Vanderwerf, Eden Prairie, MN (US); Mats Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 27 days.

(21) Appl. No.: 10/027,803

(22) Filed: Dec. 20, 2001

(65) Prior Publication Data

US 2003/0117317 A1 Jun. 26, 2003

(51) Int. Cl.[7] .................................................. G01S 5/14
(52) U.S. Cl. ................................................. 342/357.02
(58) Field of Search ...................... 342/357.02; 701/213

(56) References Cited

U.S. PATENT DOCUMENTS 5,760,737 A    6/1998  Brenner
6,114,988 A  * 9/2000  Schipper et al. ....... 342/357.06

OTHER PUBLICATIONS

Jang, C. W. et al, "Adaptive Fault Detection in Real–time GPS Positioning," IEE Proc. of Radar, Sonar, and Navigation, vol. 147 Issue 5, Oct. 2000, pp. 254–258.*

Michalson, William R., "Ensuring GPS Navigation Integrity using Receiver Autonomous Integrity Monitoring," IEEE Aerospace and Electronics Systems Magazine, vol. 10, Issue 10, Oct. 1995, pp. 31–34.*

Lee, Dr. Young C., "Receiver Autonomous Integrity Monitoring (RAIM) Capability for Sole Means GPS Navigation in Oceanic Phase of Flight," IEEE PLANS '92, Mar. 1992, pp. 464–472.*

"Integrated GPS/Inertial Fault Detection Availablity" by Mats Brenner—Revised for Publication in Navigation Mar. 1996.

* cited by examiner

Primary Examiner—Gregory C. Issing
(74) Attorney, Agent, or Firm—Matthew Luxton

(57) ABSTRACT

A global positioning system for use with a plurality of transmitting satellites is disclosed wherein a full position solution is obtained from a number N of satellite transmissions and a plurality of sub-solutions each based on a different number (N−1) of satellite transmissions are obtained to determine if a satellite is faulty. A plurality of sub-sub-solutions is then obtained based on a different combination of N−2 satellites with each combination containing the satellites of different sub-solutions and excluding one other satellite in addition. An examination of the sub-sub-solutions provides an indication of which one of the satellites is the failed satellite.

33 Claims, 3 Drawing Sheets ated Jun. 3, 1998 to Mats
FAULT DETECTION AND EXCLUSION FOR GLOBAL POSITION SYSTEMS

BACKGROUND OF THE INVENTION

1. Field of the Invention

The present invention relates to global position systems, GPS, and more particularly to an improvement for detecting and excluding erroneous information from a transmitting satellite in order to assure greater accuracy and integrity.

2. Description of the Prior Art

U.S. Pat. No. 5,760,737 (herein "the '737 patent") entitled "Navigation System with Solution Separation Apparatus for Detecting Accuracy Failures" issued Jun. 3, 1998 to Mats Brenner, and assigned to the applicant of the present invention, discloses a GPS system for determining when an error occurs in one of a plurality of transmitting satellites, and for establishing an accuracy or "error bound". This is achieved using a position solution obtained from at least five transmitting satellites and comparing that with a plurality of position sub-solutions, each of which is derived from a different subset of the at least five transmitting satellites. Specifically, a filter that excludes a different one of the transmitting satellites is employed to obtain the sub-solutions. This yields a plurality of solution separation parameters each based on the statistics of a separation between the position solution and respective position sub-solution. A plurality of discriminators, each based on the distance between a position solution and a respective sub-solution, is obtained and an indicator indicates a fault when one of the discriminators is greater than one of the solution separation parameters.

Unfortunately, the determination that a fault exists does not provide information as to which of the transmitting satellites is in error.

SUMMARY OF THE INVENTION

The present invention employs a plurality of sub-sub-solutions for each of the sub-solutions. Each sub-sub-solution excludes a different satellite in addition to the satellite excluded by the parent sub-solution. As was the case with the parent solution, the separation between each sub-sub-solution and its parent sub-solution is compared to a detection threshold. If the separation for a particular sub-solution and any of its sub-sub-solutions exceeds the detection threshold then the satellite represented by the particular sub-solution cannot be the failed satellite. If one and only one sub-solution is found for which the separation between it and all of its sub-sub-solutions are less than the detection threshold, that the satellite represented by that sub-solution is the failed satellite.

DETAILED DESCRIPTION OF THE PREFERRED EMBODIMENTS

Figure 1:
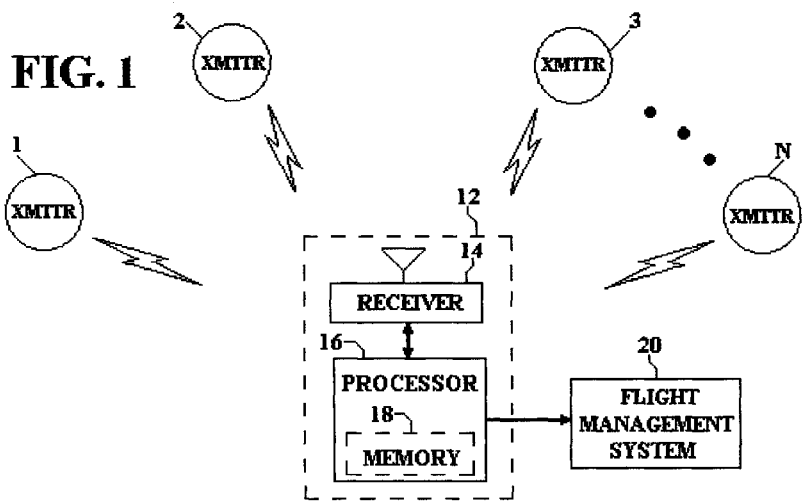
FIG. 1 shows the first navigation system of the '737 patent and the present invention.

In the above referred to '737 patent, herein incorporated by reference, the system utilizes a number, N, of transmitting satellites to determine a full solution for the position of the receiving aircraft and then by taking N groups of satellites, each group omitting a different one of the transmitting satellites, determining a plurality of sub-solutions from which it could be found if one of the satellites was transmitting an erroneous signal greater than a calculated "protection limit" or "error bound" and alerting the pilot or flight management system that the integrity of the position system was unacceptable. More particularly, if it is assumed that six transmitting satellites are in view and the full solution is generated by analyzing their signals. The first sub-group might include satellites 2, 3, 4, 5, and 6 (omitting 1), the second sub-group might include satellites 1, 3, 4, 5, and 6 (omitting 2), the third subgroup might include satellites 1, 2, 4, 5, and 6 (omitting 3) etc. to the sixth sub-group which would include satellites 1, 2, 3, 4, and 5 (omitting 6). From each subgroup, a different sub-solution is obtained and from the sub-solutions, it may be determined if there is a satellite that should be considered faulty. However, determining which of the six satellites is the faulty one is not determinable from the system of the '737 patent.

The present invention takes the procedure one step further. In the present invention, each sub-group is split into N−1 sub-sub-groups with each sub-sub-group excluding a different one of the satellites in its group in addition the satellite omitted in the first sub-group. More particularly, using the example above, with the first sub-group consisting of satellites 2, 3, 4, 5, and 6 (omitting 1), five sub-sub-groups would be formed. The first sub-sub-group might consist of satellites 3, 4, 5, and 6 (omitting 1 and 2), the second sub-sub-group might consist of satellites 2, 4, 5, and 6 (omitting 1 and 3), the third sub-sub-group might consist of satellites 2, 3, 5, and 6 (omitting 1 and 4) etc. to the fifth sub-sub-group consisting of 2, 3, 4, and 5 (omitting 1 and 6). In similar fashion the second sub-group consisting of satellites 1, 3, 4, 5, and 6 (omitting 2) might be divided into another five sub-sub-groups with the first consisting of satellites 3, 4, 5, and 6 (omitting 2 and 1) the second consisting of satellites 1, 4, 5, and 6 (omitting 2 and 3) etc. to the fifth sub-sub-group consisting of satellites 1, 3, 4, and 5 (omitting 2 and 6). This sub-sub-grouping continues for each of the sub-groups until there are a total of 30 sub-sub-groups, each consisting of 4 satellites with 2 of the satellites omitted.

The sub-sub-groups are processed to produce sub-sub-solutions in substantially the same way that the sub-solutions were obtained from the sub-groups in the '737 patent. Furthermore, the sub-sub-solutions are processed in substantially the same way that the sub-solutions were processed in the '737 patent, and, as will be shown, a result is obtained that not only determines the integrity limit (which bounds the error due to both an undetected fault and a rare normal excursion) but also determines an exclusion limit (which bounds the error due to a fault which has not yet been isolated and excluded.).

FIG. 1 is the same as FIG. 1 of the above referred to '737 patent and performs the same functions as was described in the '737 patent. It will not be further described here.

Figure 2:
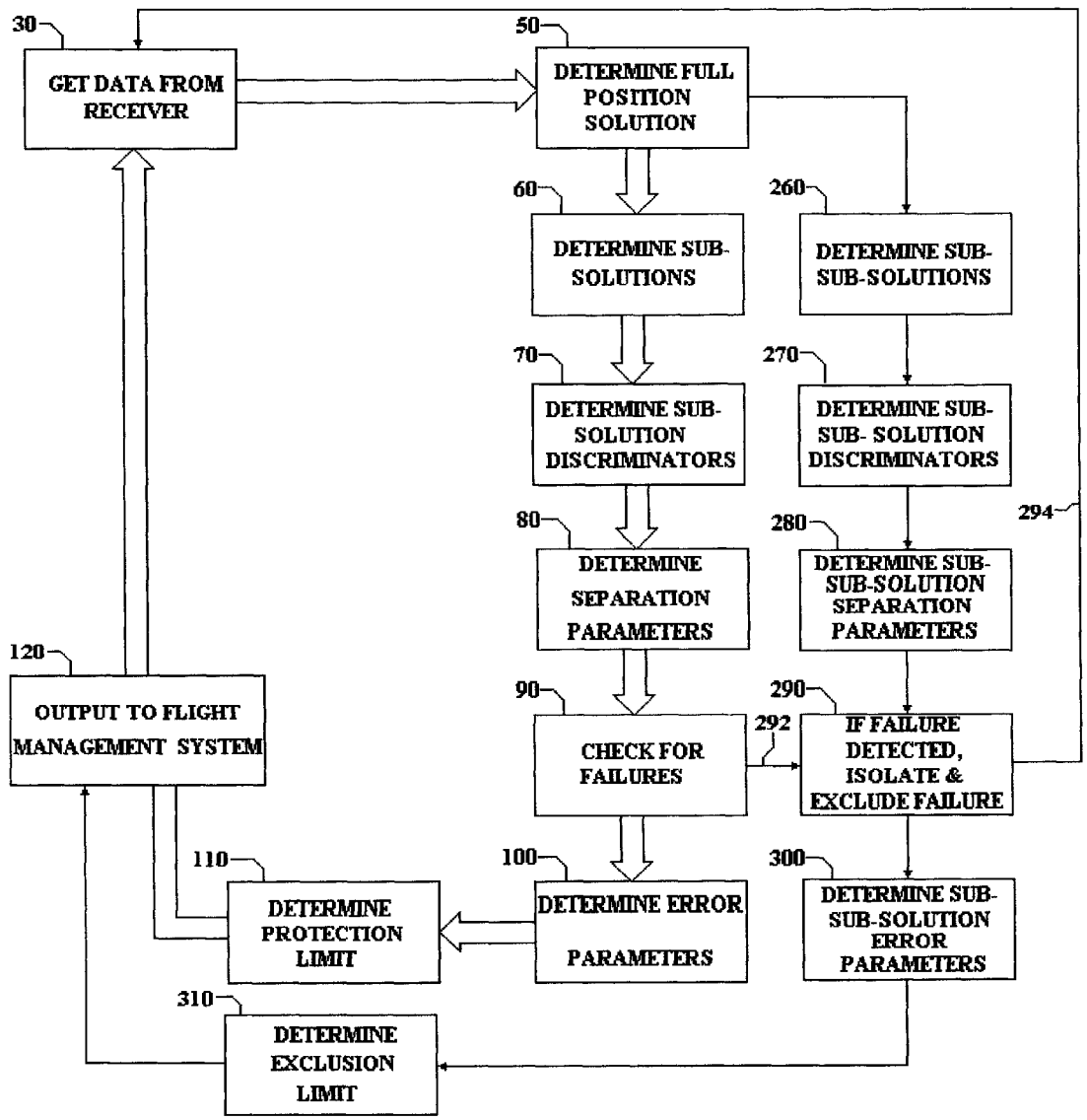
FIG. 2 shows the first method of operating the first navigation system of the '737 patent with the addition of the present invention.

In FIG. 2, those portions which are joined by double line arrows are the same as FIG. 2 of the '737 patent and those portions joined by single line arrows represent the additions of the present invention. The portions shown by double arrows operate in the same manner as in the '737 patent and will not be further described here. The original reference numerals have been retained for those elements of the '737 patent, and thus steps 30, 50, 60, 70, 80, 90, 100, 110, and 120 operate the same as FIG. 2 of the '737 patent, with a few exceptions which will be discussed hereinafter.

Steps shown by boxes 260, 270, 280 290, 300, and 310 are the steps of the present invention and in most cases these steps are similar to the steps 60, 70, 80, 90, 100 and 110 respectively. Accordingly, for ease in following the description of the present invention, the new reference numerals have been chosen to be the same as those in the '737 patent except that they are increased by 200. Thus, step 260 is similar to step 60, etc.

As in the '737 patent, normal operation begins with processor obtaining pseudorange measurements from receiver 14 in Step 30. In this step, the processor also determines the number of satellite transmitters N. The processor then forms an N-element vector $\rho_{meas}$ that contains the pseudorange measurements. The process then "linearizes" the non-linear equations governing the position solution around an initial estimate of the position solution and an initial receiver clock offset estimate. This requires defining $\Delta\rho_{meas}$, an N-element vector of pseudorange residuals according to $$\Delta\rho_{meas} = \rho_{meas} - \rho_{est} \quad (1)$$

where $\rho_{meas}$ is the N-element column vector of measured pseudoranges and $\rho_{est}$ is an N-element vector for the estimated pseudoranges derived from the initial position estimate and the initial clock offset estimate.

In step 50, the processor determines a full position solution $\Delta r_0$, using pseudorange residuals derived from the N signals and defined as $$\Delta r_0 = S_0 \Delta\rho_{meas} \quad (2)$$

where $S_0$ is a 4×N least squares solution matrix.

In step 60, the '737 patent calculates several sub-solutions $\Delta r_1, \Delta r_2 \ldots \Delta r_N$, each based on a respective subset of the N pseudorange measurements. The nth sub-solution in the '737 patent is defined as $$\Delta r_n = S_n \Delta\rho_{meas} \quad (3)$$

Step 260 of the present invention is like step 60, except that a plurality of sub-sub-solutions, $\Delta r_{nm}$ (n=1, 2 ... N; m=1, 2 ... N; n≠m) are calculated with each based on a respective sub-subset of the N sub-solutions. As explained above, each sub-sub-group contains the same satellites as each sub-group (N−1) except that it also excludes one other additional satellite. The mth sub-sub-solution of sub-solution n, is defined as $$\Delta r_{nm} = S_{nm} \Delta\rho_{meas} \quad (3s)$$

where $S_{nm}$ is a 4×N least-square sub-sub-solution matrix with a zero nth column and a zero mth column. Note that where an equation applicable to the present invention is similar to an equation applicable to the '737 patent, the equation is numbered the same except that an "s" is added thereto.

In the preferred embodiment, the sub-sub-solutions $\Delta r_{nm}$, are, as in the '737 patent, 4-element vector quantities with three elements representing respective north, east, and down coordinates and a fourth element $c\Delta t$ where c is the speed of light and $\Delta t$ is the receiver clock offset.

In step 270, like in step 70 of the '737 patent, the processor computes discriminators $d_{nm}$(n=1, 2 ... N; m=1, 2 ... N; n≠m) for the respective sub-sub-solutions $\Delta r_{nm}$(n=1, 2 ... N; m=1, 2 ... N; n≠m) The discriminator $d_{nm}$ may be any mathematical quantity based on a mathematical distance or separation between the mth sub-sub-solution $\Delta r_{nm}$ and its parent sub-solution $\Delta r_{nm}$. The preferred embodiment defines discriminators $d_{nm}$ as the actual horizontal distance between each sub-solution $\Delta r_n$ and the respective sub-sub-solutions $\Delta r_{nm}$. In the horizontal, or north-east coordinate plane, the distance $d_{nm}$ between sub-sub-solution $\Delta r_{nm}$, and sub-solution $\Delta r_n$, is $$d_{nm} = \sqrt{[(\Delta r_n(N) - \Delta r_{nm}(N)]^2 + [(\Delta r_n(E) - \Delta r_{nm}(E)]^2} \quad (4s)$$

where (N) and (E) denote the north and east components of the nth sub-solution and its mth sub-sub-solution.

Figure 2A:
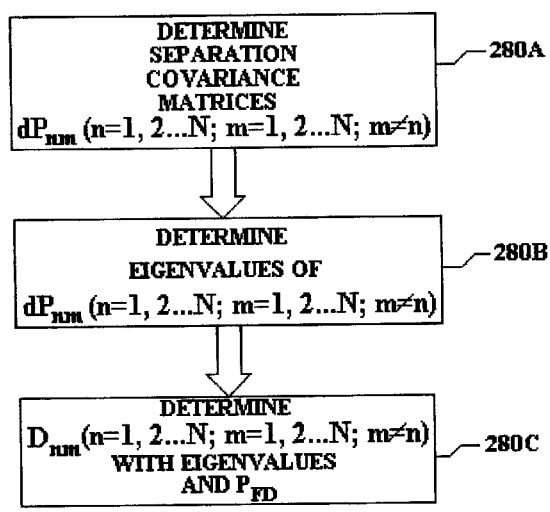
FIGS. 2A, 2B, and 2C show details of steps 280, 300 and 310 of FIG. 2.

In step 280, like in step 80 of the '737 patent, processor 16 computes a set of solution separation parameters $D_{nm}$(n=1, 2 ... N; m=1, 2 ... N; n≠m) based on the separation statistics of the sub-solution from the respective sub-sub-solutions. Computing the solution separation parameters entails sub-steps 280A, 280B, and 280C shown in FIG. 2A.

Step 280A requires computing covariance matrices $dP_{nm}$ (n=1, 2 ... N; m=1, 2 ... N; n≠m) which describe the statistics of the respective separations between each sub-solution $\Delta r_n$ and its sub-sub-solutions $\Delta r_{nm}$. The covariance matrix $dP_{mn}$ is defined as $$dP_{nm} = E[(\Delta r_n - \Delta r_{nm})(\Delta r_n - \Delta r_{nm})^T] \quad (5s)$$

where E denotes expectation and superscript T denotes transposition. In the preferred implementation, processor 16 computes the covariance matrices, using the equivalent relation $$dP_{nm} = E(S_n - S_{nm})\sigma_{pr}^2(S_n - S_{mn})^T \quad (6s)$$

where $$\sigma_{pr}^2$$

is the variance of the pseudorange measurements.

In step 280B, the processor determines the position-domain eigenvalues of covariance matrices $dP_{nm}$ in the same way and for the same purpose as in the '737 patent and again, the maximum eigenvalue $(\lambda_{dPnm})_{max}$ of each covariance matrix determines the maximum separation variance.

Thus, in step 280C processor 16 uses the maximum eigenvalues $(\lambda_{dPnm})_{max}$ to determine the maximum separations, or solution separation parameters $D_{nm}$ according to $$D_{nm} = \sqrt{(\lambda_{dPnm})_{max}} \; Q^{-1}[P_{FD}/2(N-1)] \quad (7s)$$

where $P_{FD}$ is the probability of false detection and, $Q^{-1}$ denotes the inverse of $$Q(x) = \frac{1}{\sqrt{2\pi}} \int_x^\infty e^{-\frac{r^2}{2}} dr \quad (8s)$$

the well-known normalized cumulative distribution function.

Having determined the solution separation parameters, processor 16 executes step 90 in the '737 patent and determines if a failure has occurred. If a failure occurs, this information is transferred to step 290 as shown by arrow 292. Step 290 involves a determination of which of the satellites is the one that failed. The logic for exclusion is as follows: Any transmitter, r, will be excluded as the failed transmitter if, and only if, $d_{rm} < D_{rm}$ for all m≠r, and $d_{nm} \geq D_{nm}$ for at least one m≠n for all n≠r where $d_{rm}$ is the horizontal distance between sub-sub-solution $\Delta X_{rm}$ and sub-solution $\Delta X_r$.

If sub-solution n is separated from at least one of its sub-sub-solutions by more than the exclusion threshold, then transmitter n cannot be the failed transmitter because the failed transmitter is still included in sub-solution n. On the other hand, if the separation of sub-solution r from each of its sub-sub-solutions is less than the exclusion threshold, then transmitter r is the failed transmitter (providing each of the other sub-solutions is separated from at least one of its sub-sub-solutions by more than the exclusion threshold).

Having determined a failed transmitter, a signal indicative of the failed transmitter is returned to step 30 via line 294 so that at the next determination of the number of satellites N, step 30 will exclude the failed satellite.

Figure 2B:
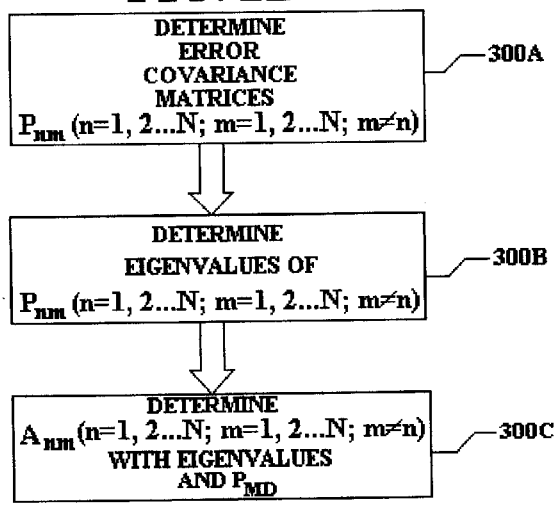

Step 300 is like step 100 in which the error parameters $A_{nm}$(n=1, 2 ... N; m=1, 2 ... N; m≠n) are determined based on the noise induced errors in respective sub-sub-solutions $\Delta r_{nm}$. Step 300 comprises three sub-steps 300A, 300B and 300C which are shown in FIG. 2B.

In step 300A, processor 16 calculates error covariance matrices $P_{nm}$ describing the statistics of the noise-induced errors for corresponding sub-sub-solutions $\Delta r_{nm}$. The error covariance matrix $P_{nm}$ is $$P_{nm} = E(\delta r_{nm} \delta r_{nm}^T) \tag{9s}$$

where $\delta r_{nm}$ represents the effect of noise on the mth sub-sub-solution of sub-solution n.

$$\delta r_{nm} = S_{nm} w \tag{10s}$$

where w is the N-dimensional measurement noise vector and $E(ww^T)$ is $$\sigma_{pr}^2.$$

In the preferred embodiment, the processor calculates matrices $P_{nm}$ from.

$$P_{nm} = S_{nm} \sigma_{pr}^2 S_{nm}^T \tag{11s}$$

In step 300B, the processor determines the eigenvalues of error covariance matrices $P_{nm}$. The eigenvalues define the variance, that is, the spread of the errors around the average error, and thus control of the magnitude of the maximum error in sub-sub-solution $\Delta r_{nm}$ depends on the square root of the maximum eigenvalue $(\lambda_{Pnm})_{max}$ of the corresponding error covariance matrix.

In step 300C, the processor computes error parameters $A_{nm}$ using $$A_{nm} = \sqrt{(\lambda_{Pnm})_{max}} \, Q'^{-1}(P_{MD}) \tag{12s}$$

where $P_{MD}$ is the probability of missed detection.

Figure 2C:
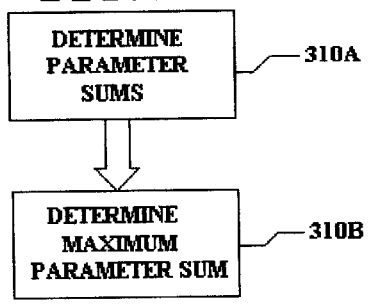

The next step in FIG. 2 is step 310. In this step, as with determining the protection limit in step 110 of the '737 patent, the processor determines the exclusion limit, using the solution separation parameters $D_{nm}$ and the sub-solution error parameters $A_{nm}$. This preferably entails determining the maximum sum of $D_{nm}$ and $A_{nm}$, over n=1, 2 ... N; m=1, 2 ... N; n≠m. FIG. 2C shows this as two steps: step 310A determines M parameters sums ($D_{nm}+A_{nm}$), over n=1, 2 ... N; m=1, 2 ... N; m≠n and step 310B selects the maximum of these parameter sums as the exclusion limit. Functionally, this is expressed as Exclusion Limit=max($D_{nm}+A_{nm}$) over n=1, 2 ... N; m=1, 2 ... N; m≠n (13s)

After calculating the integrity limit in step 110 and the exclusion limit in step 310, processor 16 executes step 120 by outputting the full position solution, the protection limit and the exclusion limit as well as the detection flag to the flight management system 20 which indicates if a failure has been detected but not yet isolated. After executing the output step 120, the processor returns to step 30 to get new data from the receiver and to determine N, excluding any satellite that failed, and to calculate a new position solution, protection limit, new detection flag and identify which satellite failed, if applicable.

It is seen that the first embodiment accomplishes all that the '737 patent accomplished and, in addition, provides information not only when a failure occurs but also which satellite failed. Although the first embodiment explicitly operates only on the present measurement data, in so-called "snapshot" fashion, its advantage is in the unique suitability for Kalman filter implementations. Through the use of Kalman filters, the processor incorporates not only present measurement data, but also past measurement data into the integrity monitoring process. Moreover, Kalman filters enable the processor to incorporate inertial sensor data into the determination of satellite transmitter failures, as evidenced in the second embodiment.

Figure 3:
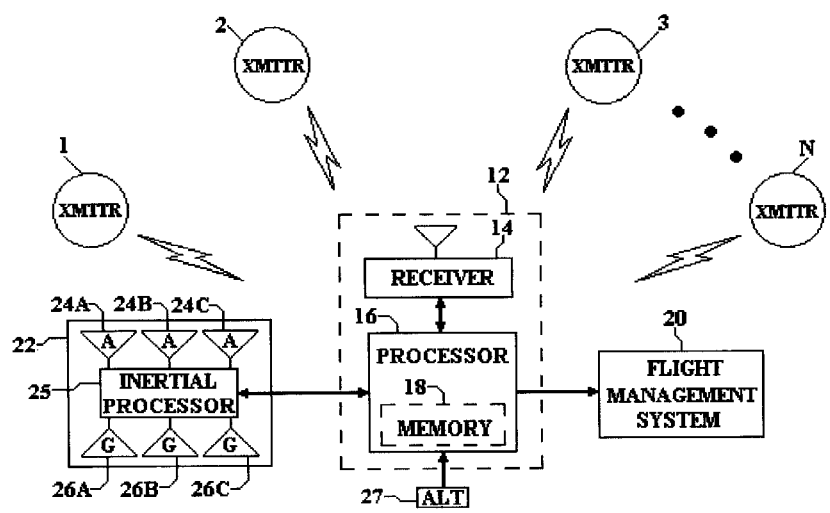
FIG. 3 shows the second navigation system of the '737 patent and the present invention.

As shown in FIG. 3, the second embodiment extends the radio navigation system of FIG. 1 with the addition of an inertial reference unit 22 for providing inertial data to the processor 16 and pressure altitude sensor 27 for providing altitude data to processor 16. FIG. 3 is the same in form and operation as FIG. 3 of the '737 patent and uses the same reference numerals. Accordingly, it will not be described further herein.

Figure 4:
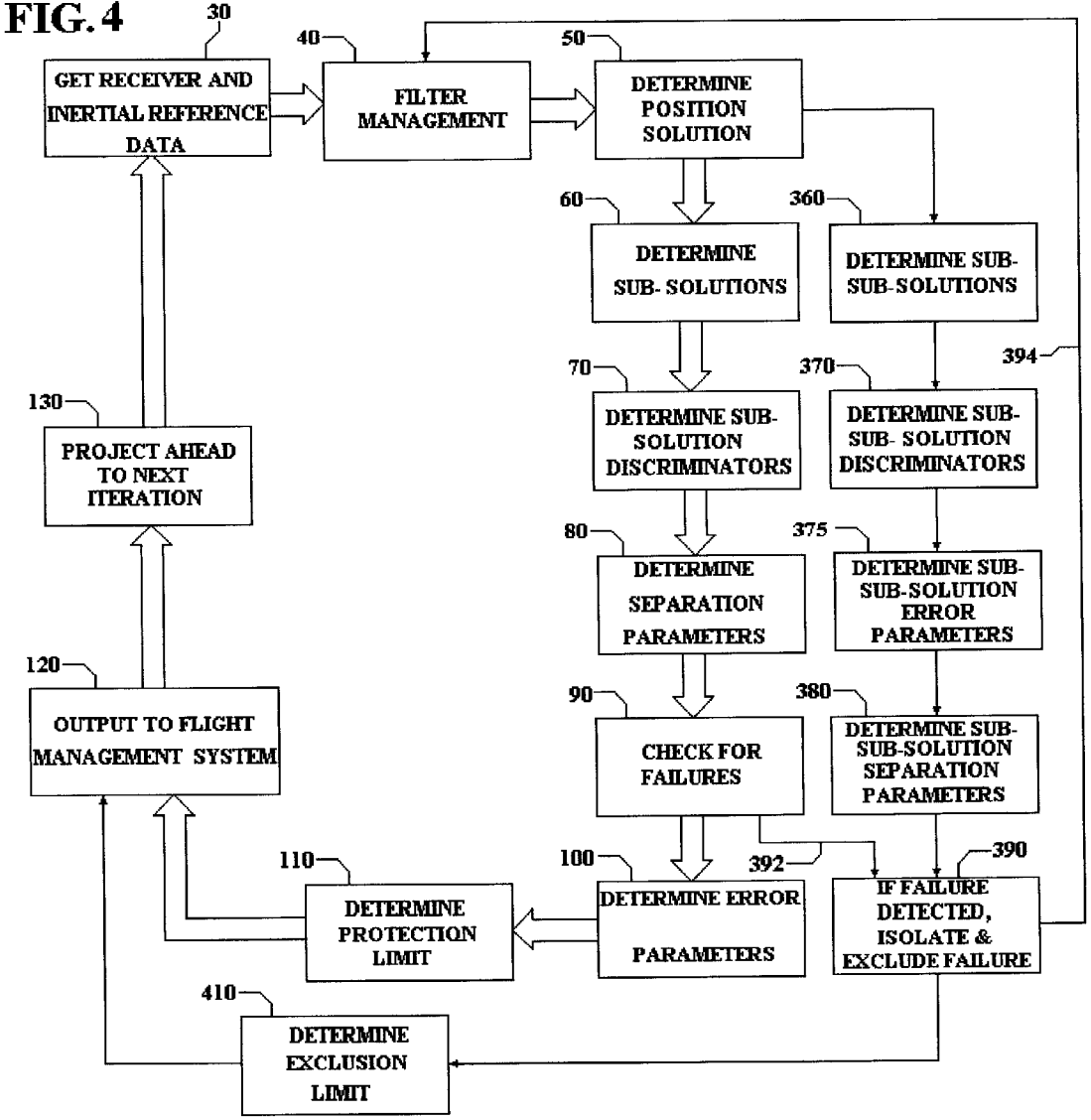
FIG. 4 shows the second method of operating the second navigation system of the '737 patent with the addition of the present invention.

As was the case with respect to FIG. 2, those portions of FIG. 4 which are joined by double line arrows are the same as FIG. 4 of the '737 patent and those portions joined by single line arrows represent the additions of the present invention. The portions shown by double arrows operate in the same manner as in the '737 patent and will not be further described here. The original reference numerals are retained for those elements of the '737 patent and thus steps 30, 40, 50, 60, 70, 80, 90, 100, 110, 120 and 130 operate the same as FIG. 4 of the '737 patent with a few exceptions which will be discussed hereinafter. One significant exception, to be described, arises in that the present invention provides a new way of computing the separation covariance parameters (see step 380 of the present invention below). This is accomplished by using the error covariance parameters (which are obtained in step 375, below, in a manner similar to step 100 of the '737 patent). Furthermore, step 80 in the '737 patent could also be computed the same way as step 380 of the present invention, if desired. In any event, for purposes of the present invention, the step corresponding to step 100 of the '737 patent (which would have been step 400 of the present invention) is removed and inserted after step 370 in the present invention with reference numeral 375 for convenience.

As was the case in the '737 patent, inertial processor 25, determines an inertial position solution $r_i$, preferably a three-element vector in an earth-fixed reference frame. Inertial processor 26, also preferably converts the acceleration data into raw acceleration vector $a_{raw}$, and attitude data into raw angular velocity vector $\omega_{raw}$. Inertial processor 26 also determines a transformation matrix C, for transforming body frame coordinates to local vertical frame L, a three element rotation vector $\omega_{IE}$, which describes rotation of the earth based frame E versus inertial frame I transformed to L frame, and rotation vector $\omega_{IE}$, which describes rotation of the L frame versus the earth fixed frame E transformed to L frame.

The focal point of the Kalman filter implementation is the hybrid state vectors $\Delta X_0 - \Delta X_N$, with each having 18 error states and stemming from the exclusion of the nth satellite transmitter. In other words, $\Delta X_0$, excludes no satellite transmitters and $\Delta X_N$, excludes the nth satellite transmitter. The nth state vector is defined as $$\Delta X_n^T = (\psi, \Delta v, \Delta r, \Delta rtc, \Delta vfc, \Delta \omega_0, \Delta a_0 \Delta alt b) \tag{14}$$

where $\psi$ is a three-element attitude error vector;

$\Delta v$ is a three-element velocity vector;

$\Delta r$ is a three-element hybrid position solution excluding the nth pseudorange measurement;

$\Delta rtc$ is a one-element receiver clock phase error expressed as a distance (analogous to $c\Delta t$ in the first embodiment);

$\Delta vfc$ is a one-element receiver clock frequency error expressed as a velocity;

$\Delta \omega_0$ is a three element vector of gyro biases modeled as first order Markov processes with a 100 hour time constant;

$\Delta a_0$ is a three element vector of accelerometer biases modeled as first order Markov processes with a 100 hour time constant; and $\Delta alt$ is a one-element pressure altitude bias.

(For clarity, the "n" subscripts are not shown on each state variable in $\Delta X_n$.)

Steps shown by boxes 360, 370, 375, 380 390 and 410 are the steps of the present invention and in most cases these steps are similar to the steps 60, 70, 80, 90, 100 and 110 respectively except, as noted above, step 375 of the present invention is similar to step 100 of the '737 patent but to provide a basis for a new calculation of step 380, has been moved to a position prior to step 380 and has been renumbered 375. Other than this one substitution, in the following description of the present invention, the new reference numerals are the same as those in the '737 patent except that they are increased by 300.

Again, the method begins in step 30 when the processor retrieves the following inertial data from the inertial reference unit 22:

inertial position solution $r_i$, raw acceleration vector $a_{raw}$, raw angular velocity vector $\omega_{raw}$, transformation matrix C, rotation vector $\omega_{IE}$, and rotation vector $\omega_{EL}$.

After retrieving this inertial data, the processor models the inertial error dynamics based on motion of the aircraft. This occurs within the context of a linearized inertial error model that is referenced to local vertical coordinate frame L. This inertial error model defines an altitude error vector $\psi$, a velocity error vector $\Delta v$, and a hybrid position solution $\Delta r$, each stemming from the solution of the following three differential equations:

$$\psi = C\Delta\omega_{IE} + \psi x(\omega_{IE+\omega EL}) \tag{15}$$

$$\Delta v = \psi x C a_{raw} + C\Delta a_{IE} + (2\omega_{IE} + \omega_{EL})x\Delta v + G\Delta r + \Delta g \tag{16}$$

$$\Delta r = \Delta v + \omega_{EL} x \Delta r \tag{17}$$

where $\Delta \omega_0$ is gyro bias modeled as first order Markov processes with a 100-hour time constant;

$\Delta \omega_{IB}$ is $\Delta \omega_0$+scale factor and misalignment errors;

$\Delta a_0$ is accelerometer bias modeled as first order Markov processes with a 100 hour time constant;

$\Delta a_{IB}$ is $\Delta a_0$+scale factor and misalignment errors;

$\Delta g$ gravity deflections and anomaly ($v_x g$, $v_y g$, $\Delta g_c$) G is 3×3 matrix defined as $$G = \begin{bmatrix} -g(U)/R^{(1)} & 0 & 0 \\ 0 & -g(U)/R^{(1)} & 0 \\ 0 & 0 & 2g(U)/R^{(2)} \end{bmatrix} \tag{18}$$

where R denotes the radius of the earth and g(0) denotes gravity at zero height. (1) and (2) identify the specific terms affecting integrity as is discussed in the '737 patent.

Step 30 further requires the processor to retrieve pseudorange measurements from receiver 14 and determines the number of pseudorange measurements N. After retrieving the pseudoranges, the processor determines N-element pseudorange residual vectors $\Delta \rho_0(k) - \Delta \rho_N(k)$, with the nth pseudorange residual $C>_N(k)$ defined as $$\Delta \rho_n(k) = \rho_{n,meas}(k) - \rho_{n,est}(k) \tag{19}$$

In this equation, $\rho_{n,meas}$ are the actual pseudorange measurements and $\sigma_{n,est}$ are the estimated pseudoranges based on the previous nth absolute hybrid sub-solution $r_n(k)$ and the receiver clock offset $\Delta rtc_n$, with the subscript, n, denoting exclusion of the nth pseudorange from the vector. The nth absolute hybrid sub-solution, $r_n(k)$, refers to $$r_n(K) = r_i(k) + \Delta r_n^E(k) \tag{20}$$

where the superscript E denotes that the relative hybrid position solution $\Delta r_n$ has been transformed from the L frame to the earth fixed frame for addition to the inertial position solution $r_i$.

In this embodiment, the Kalman filters include an error state for the altitude bias. Thus, in this step, the processor also determines a pressure altitude measurement residual based on the input pressure altitude from sensor 27 and the pressure altitude estimate based on the predicted altitude and the predicted pressure altitude bias. The predicted altitude stems from $r_n(k)$ as already defined. The altitude residual is defined the same for all the state vectors.

In step 40, the processor establishes the initial values for position solution $\Delta r_0(k)$ and sub-solutions $\Delta r_1(k) - \Delta r_N(k)$, separation covariance matrices $dP_1(k) - dP_N(k)$ and error covariance matrices $P_1(k)$–$P_N(k)$, where k signifies their temporal correspondence to the kth iteration.

In the preferred embodiment, step 40 also requires the processor to monitor changes in the number and composition of the satellite transmitters determining the position solution. If the number of satellites increases, the processor assigns a state vector (sub-filter) and related variables to that satellite for processing along with the existing ones. And, if a satellite transmitter moves out of view or otherwise becomes unavailable, the processor decides when it can safely release its corresponding state vector $\Delta X_n$, that is, cease computing a particular sub-solution $\Delta X_n$ and its associated discriminator $d_n$, separation parameter $D_n$, and error parameter $A_n$. Sub-solution $\Delta X_n$ becomes unnecessary, and thus eligible for release, when the nth satellite transmitter fails, moves out of view, or otherwise becomes irrelevant to the full position solution. To ensure that the remaining sub-solutions remain unaffected by this failure, the processor delays the release until the remaining sub-solutions have maintained their respective HDOPs (horizontal dilution of precision) below a threshold for a specific time period, such as five minutes.

As indicated in steps 50 and 60, the next steps entail computing the full solution $r_0(k)$ and sub-solutions $r_1(k)$–$r_N(k)$. Similarly, steps 50 and 360 determine the sub-sub-solutions $\Delta r_{nm}$(n=1, 2 ... N; m=1, 2 ... N; n≠m), each based on a respective sub-subset of the N sub-solutions as explained above. As explained in the '737 patent, with the Kalman implementation, these solutions depend on the Kalman gain vectors using math detailed in the '737 patent and not repeated here.

Likewise, since steps 70, 80, 90, 100, 110 and 120 are performed in the same manner as in the '737 patent they will not be further discussed here except to note that if step 80 were performed in the same manner as step 380 of the present invention, step 100 would precede step 80 and that in step 90, when a check for failure is made, any indication of failure is presented via line 292 to step 390 of the present invention as will be discussed below.

In the present invention, steps 360 and 370 operate in the same manner as in the first embodiment. Step 360 calculates a plurality of sub-sub-solutions, $\Delta r_{nm}$(n=1, 2 ... N; m=1, 2 ... N; n≠m) with each based on a respective sub-subset of the N sub-solutions. As explained above, each sub-sub-group contains the same satellites as each sub-group (N−1) and also excludes one other additional satellite. The mth sub-sub-solution of sub-solution n, is defined as in equation (3s).

In the preferred embodiment, the sub-sub-solutions $\Delta r_{nm}$, are, as in the '737 patent, 4-element vector quantities with three elements representing respective north, east, and down coordinates and a fourth element c$\Delta$t where c is the speed of light and $\Delta$t is the receiver clock offset.

In step 370, like in the first embodiment, the processor computes the sub-sub-solution discriminators $d_{nm}$(n=1, 2 ... N; m=1, 2 ... N; n≠m) for the respective sub-sub-solutions $\Delta r_{nm}$(n=1, 2 ... N m=1, 2 ... N; n≠m).

Now, in step 375, which operates in the same manner as step 300 of the first embodiment, in which the error parameters $A_{nm}$(n=1, 2 ... N; m=1, 2 ... N; m≠n) are determined based on the noise induced errors in respective sub-sub-solutions $\Delta r_{nm}$. Step 375 comprises the same three substeps 300A, 300B and 300C s in the first embodiment and which are shown in FIG. 2B. In step 375, the processor computes error parameters $A_{nm}$.

In step 380, the processor determines the solution separation parameters $D_{nm}$ over n=1, 2 ... N; m=1, 2 ... N; n≠m but does so using a different process. Whereas the '737 patent computed the separation covariance matrix as part of a dual (36×36) partitionable covariance matrix, the preferred method in the present invention is to compute the separation covariance matrix describing the statistical separation between the nth sub-solution and its mth sub-sub-solution as follows:

$$dP_{nm}(k) = P_n(k) - P_{nm}^{cross}(k) - [P_{nm}^{cross}(k)]\underline{T}^T + P_{nm}(k) \qquad (21s)$$

where $P_n$ is the 18×18 error covariance matrix for the sub-solution $\Delta X_n(k)$, $P_{nm}(k)$ is the 18×18 error covariance matrix for the mth sub-sub-solution of the nth sub-solution $\Delta X_{nm}(k)$, and $$P_{nm}^{cross}(k)$$

is the 18×18 matrix describing the cross-covariance between the sub-solution $\Delta X_n(k)$ and its mth sub-sub-solution $\Delta X_{nm}(k)$. That is, $$P_n(k) = E[\Delta X_n(k)\Delta X_n^T(k)] \qquad (22s)$$

$$P_{nm}(k) = E[\Delta X_{nm}(k)\Delta X_{nm}^T(k)] \qquad (23s)$$

$$P_{nm}^{cross}(k) = E[\Delta X_n(k)\Delta X_{nm}^T(k)] \qquad (24s)$$

The process updates the cross-covariance matrix to account for the measurement update of the sub-solution and the sub-solution for the ith satellite according to $$P_{nm}^{cross}(k) = (I - g_n h_i^T)P_{nm}^{cross}(k)(I - h_i g_{nm}^T) + g_n r g_{nm}^T \qquad (25s)$$

where I is the 18×18 identity matrix. Note the kth iteration notations have been omitted from the Kalman gains $g_n$ and $g_{nm}$. Once the cross-covariance is updated, the separation covariance is computed per equation (21s).

In step 90, the processor checks for transmitter failures by comparing the actual separations $d_1$–$d_N$ to respective solution separation parameters $D_1$–$D_N$. The solution separation parameters $D_1$–$D_N$ function as failure detection thresholds for the individual sub-solutions. Thus, if the actual separation $d_n$ between sub-solution $\Delta r_n$ and the full solution $\Delta r_0$ exceeds its respective separation parameter $D_n$, the processor sets a failure flag indicating detection of a transmitter failure and sends a signal over line 392 to step 390 of the present invention. Steps 100, 110 and 120 of the '737 patent and steps 390 and 410 of the present invention are the same as in the first embodiment except that if the new procedure for calculating the separation parameters is used, step 100 of the '737 patent would precede step 80.

After calculating the integrity limit in step 110 and the exclusion limit in step 410, processor 16 executes step 120 by outputting the full position solution, the protection limit and the exclusion limit as well as the failure flag to step 130 for projection ahead to the next iteration.

Step 130 not only involves the determining of the (k+1)th separation covariance matrices $dP_1$ (k+1) through $dP_N$(k+1) defining the statistical separations between the full solution and each of the N sub-solutions, but also entails determining the (k+1)th separation covariance matrices $dP_{nm}$ over n=1, 2 ... N; m=1, 2 ... N; m≠n defining the statistical separation between the nth sub-solution and its mth sub-sub-solution by first propagating the cross-covariance matrices as follows:

$$P_{nm}^{cross}(k+1) = \Phi(k)P_{nm}^{cross}(k)\Phi(k)^\tau + Q(k) \qquad (26s)$$

Again, once the cross-covariance is updated, the separation covariance is computed per equation (21s).

After completing step 130, the process returns to step 30 to repeat the process entire loop shown in FIG. 4.

It is thus seen that the second embodiment provides a simple Kalman-filter extension of the first embodiment that incorporates not only inertial data but also present and past measurement data into the position solution, protection limit calculations, and exclusion limit calculations as well as the transmitter failure detection and exclusion.

Although the present invention has been described with reference to preferred embodiments, workers skilled in the art will recognize that changes may be made in form and detail without departing from the spirit and scope of the invention. In particular, those in the art will recognize that a single processor could perform all of the operations for implementing the invention or that multiple processors could share these operations. Moreover, the method itself could be divided over distinct functional units other than those used for illustration here. Of course, other changes in form and detail are also with in the spirit and scope of the invention. Accordingly, we do not intend to be limited to the specific details used to describe the preferred embodiment. The following claims define the scope of the present invention.

What is claimed is:

1. In a system for determining the position of a vehicle from the transmissions of a plurality of transmitters, one of which could be faulty, wherein a full position solution for the vehicle is determined from a combination of N transmissions and a plurality of position sub-solutions is determined from combinations of the N transmissions, each position sub-solution being based on different combination of the N transmissions but each excluding a different one of the transmissions to determine if there is a faulty transmission, the improvement comprising:

sub-sub-solution means for producing a plurality of sets of position sub-sub-solutions from the sub-solutions, wherein each set of position sub-sub-solutions corresponds to one of the sub-solutions and wherein each position sub-sub-solution in a set is based on the corresponding sub-solution wherein a different additional one of the transmissions is also excluded; and failure isolation means for analyzing the position sub-sub-solutions to determine which, if any, of the transmissions is faulty.

2. The system of claim 1, wherein the sub-sub-solution means computes sub-sub-solution discriminators based on a mathematical separation between sub-sub-solutions and their respective sub-solutions.

3. The system of claim 1, including error means for determining sub-sub-solution error parameters with each based on error statistics of a respective position sub-sub-solution.

4. The system of claim 3 wherein the error means includes:

means for determining a plurality of error covariance matrices, with each error covariance matrix based on error statistics of the respective sub-sub-solution;

means for determining a respective maximum eigenvalue of each of the error covariance matrices; and wherein the error means determines each error parameter from the respective maximum eigenvalue and a preset probability of missed detection $P_{MD}$.

5. The system of claim 1 wherein the plurality of transmitters comprise a plurality of satellites and a processor receives the transmissions and stores the past and present values of the transmissions.

6. The system of claim 5 wherein the processor provides the calculations for the full position solution, the sub-solutions, and the sub-sub-solutions.

7. The system of claim 5 further including motion sensing means to provide vehicle motion data to the processor and the processor determines the full position solution, the sub-solutions and the sub-sub-solutions from the motion information and the past and present values of the transmissions.

8. The system of claim 7 wherein the motion sensing means includes a plurality of accelerometers and a plurality of gyroscopes to provide acceleration and attitude information to the processor.

9. The system of claim 7 further including altitude sensing means to provide altitude information to the processor.

10. The system of claim 5, further including output means connected to the failure detection means to feedback any information about a faulty transmission to the processor for the next iteration of determining the full position solution, the position sub-solutions and the position sub-sub-solutions.

11. In a position determining system for a vehicle having receiving means for receiving signals from a plurality of transmitters, one of which may be faulty, and having a processor for determining a full position solution for the vehicle based on the plurality of signals and determining a plurality of position sub-solutions for the vehicle with each position sub-solution based on a respective subset of the plurality of signals, the improvement comprising:

means producing a plurality of position sub-sub-solutions for the vehicle with each position sub-sub-solution based on a respective subset of the position sub-solutions; and failure isolation means for determining which, if any, of the transmitters is faulty from the plurality of position sub-sub-solutions.

12. The position determining system of claim 11 wherein each position sub-solution is based on the number, N, of transmitters less a different one of the transmitters, and each position sub-sub-solution is based on the number, N−1, of transmitters used in calculating a respective position sub-solution less an additional transmitter different than the transmitter excluded from the respective position sub-solution.

13. The method of operating a position determining system, which includes a processor which receives transmission signals from a plurality of transmitters, one of which may be faulty, comprising the steps of:

A. determining a full position solution from a plurality of transmissions signals;

B. determining a plurality of position sub-solutions, each based on a subset of the plurality of transmission signals;

C. determining a plurality of position sub-sub-solutions, each based on a subset of one of the position sub-solutions; and D. determining from the plurality of sub-sub-solution, which of the transmitters, if any, is faulty.

14. The method of claim 13, further including the step of:

E. computing a plurality of sub-sub-solution discriminators for the respective sub-sub-solutions where each sub-sub-solution discriminator is a mathematical quantity based on the distance between a position sub-sub-solution and its respective sub-solution.

15. The method of claim 14 further including the step of:

F. computing a set of sub-sub-solution separation parameters based on the separation statistics of the sub-solution from the respective sub-sub-solutions.

16. The method of claim 15 where Step F further comprises the steps of:

F1. computing separation covariance matrices which describe the statistics of the respective separations between each sub-solution and its sub-sub-solutions.

F2. determining the position-domain eigenvalues of separation covariance matrices; and F3. using the maximum eigenvalues to determine the sub-sub-solution separation parameters.

17. The method of claim 16 further including the step:

G. determining a plurality of sub-sub-solution error parameters.

18. The method of claim 17 wherein step G includes:

G1. calculating error covariance matrices describing the statistics of the errors for corresponding sub-sub-solutions;

G2. determining the eigenvalues of the error covariance matrices; and

G3. computing the error parameters from the eigenvalues of step G2.

19. The method of claim 16 further including the step:

H. comparing a plurality of actual separations to respective sub-sub-solution separation parameters to determine which, if any, of the transmitters is faulty.

20. The method of claim 19 wherein step H includes:

H1. computing the actual separations by determining the difference between each sub-sub-solution and its respective sub-solution;

H2. determining if the actual separation for a particular sub-solution and any of its sub-sub-solutions exceeds detection threshold; and H3. producing a signal when one and only one sub-solution, is found for which the actual separation, between it and all of its sub-sub-solutions, are less than the detection threshold, that the transmitter represented by that sub-solution is the failed transmitter.

21. The method of claim 20 further including the step:

I. sending the signal indicative of the failed transmitter back to the processor for a next iteration of the method.

22. The system of claim 1, including separation means for determining sub-sub-solution separation parameters with each based on error statistics of a respective position sub-sub-solution.

23. The system of claim 22 wherein the separation means includes:

means for determining a plurality of separation covariance matrices, with each separation covariance matrix based on statistics of the respective separations between each sub-solution and its sub-sub-solution;

means for determining a respective maximum eigenvalue of each of the separation covariance matrices; and wherein the error means determines each error parameter from the respective maximum eigenvalue and a preset probability of false detection $P_{FD}$.

24. The system according to claim 22, wherein the separation means includes:

means for computing a plurality of separation covariance matrices describing the statistical separation between the nth sub-solution and its mth sub-sub-solution according to the equation:

$$dP_{nm}(k) = P_n(k) - P_{nm}^{cross}(k) - [P_{nm}^{cross}(k)] + P_{nm}(k)$$

where $P_n$ is an error covariance matrix for the sub-solution $\Delta X_n(k)$, $P_{nm}(k)$ is an error covariance matrix for the mth sub-sub-solution of the nth sub-solution $\Delta X_{nm}(k)$, and $$P_{nm}^{cross}(k)$$

is a matrix describing the cross-covariance between the nth sub-solution $\Delta X_n(k)$ and its mth sub-sub-solution $\Delta X_{nm}(k)$;

means for determining the eigenvalues of the error covariance matrix; and, means for determining the separation parameters $D_{nm}$ according to $$D_{nm} = \sqrt{(\lambda_{dPnm})_{max}} \, Q^{-1}[P_{FD}/2(N-1)]$$

where $Q^{-1}$ denotes the inverse of $$Q(x) = \frac{1}{\sqrt{2\pi}} - \int_x^\infty e^{-\frac{r^2}{2}} dr.$$

25. The system according to claim 24 further including:

mean for updating the cross covariance matrix to account for the measurement update of the sub-solution and the sub-sub-solution according to $$P_{nm}^{cross}(k) = (I - g_n h_i^T)P_{nm}^{cross}(k)(I - h_i g_{nm}^T) + g_n r g_{nm}^T$$

where I is the identity matrix.

26. The system according to claim 25 further including:

means for propagating the cross covariance matrix from a first time step to a second time step according to a filter time update process.

27. The system according to claim 26 wherein the filter time update process is performed according to:

$$P_{nm}^{cross}(k+1) = \Phi(k)P_{nm}^{cross}(k)\Phi(k)^T + Q(k).$$

28. The method of claim 13 further including the step:

G. determining a plurality of sub-sub-solution error parameters.

29. The method of claim 28 wherein step G includes:

G1. calculating error covariance matrices describing the statistics of the errors for corresponding sub,sub-solutions;

G2. determining the eigenvalues of the error covariance matrices; and

G3. computing the error parameters from the eigenvalues of step G2.

30. The method according to claim 15, wherein step F further comprises:

F1. computing a plurality of separation covariance matrices describing the statistical separation between the nth sub-solution and its mth sub-sub-solution according to the equation:

$$dP_{nm}(k) = P_n(k) - P_{nm}^{cross}(k) - [P_{nm}^{cross}(k)]^T + P_{nm}(k)$$

where $P_n$ is an error covariance matrix for the sub-solution $\Delta X_n(k)$, $P_{nm}(k)$ is an error covariance matrix for the mth sub-sub-solution of the nth sub-solution $\Delta X_{nm}(k)$, and $$P_{nm}^{cross}(k)$$

is a matrix describing the cross-covariance between the nth sub-solution $\Delta X_n(k)$ and its mth sub-sub-solution $\Delta X_{nm}(k)$;

F2. determining the eigenvalues of the error covariance matrix; and,

F3. determining the separation parameters $D_{nm}$ according to $$D_{nm} = \sqrt{(\lambda_{dP_{nm}})_{max}}\, Q^{-1}[P_{FD}/2(N-1)]$$

where $Q^{-1}$ denotes the inverse of $$Q(x) = \frac{1}{\sqrt{2\pi}} - \int_x^\infty e^{-\frac{r^2}{2}}\, dr$$

31. The method according to claim 30 further including the step:

F4. updating the cross covariance matrix to account for the measurement update of the sub-solution and the sub-sub-solution according to $$P_{nm}^{cross}(k) = (I - g_n h_i^T) P_{nm}^{cross}(k)(I - h_i g_{nm}^T) + g_n r g_{nm}^T$$

where I is the identity matrix.

32. The method according to claim 31 further including the step:

F5. propagating the cross covariance matrix from a first time step to a second time step according to a filter time update process.

33. The method according to claim 32 wherein the filter time update process is performed according to:

$$P_{nm}^{cross}(k+1) = \Phi(k) P_{nm}^{cross}(k) \Phi(k)^T + Q(k).$$

* * * * *

UNITED STATES PATENT AND TRADEMARK OFFICE
CERTIFICATE OF CORRECTION

PATENT NO. : 6,639,549 B2  Page 1 of 1
APPLICATION NO. : 10/027803
DATED : October 28, 2003
INVENTOR(S) : Vanderwerf et al.

It is certified that error appears in the above-identified patent and that said Letters Patent is hereby corrected as shown below:

IN THE SPECIFICATION

In column 10, line 9, delete

" $dP_{nm}(k) = P_n(k) - P_{nm}^{cross}(k) - [P_{nm}^{cross}(k)]\underline{T^T} + P_{nm}(k)$ "and insert therefor -- $dP_{nm}(k) = P_n(k) - P_{nm}^{cross}(k) - [P_{nm}^{cross}(k)]^T + P_{nm}(k)$ --.

IN THE CLAIMS

In Claim 24, column 14, line 8, delete

" $dP_{nm}(k) = P_n(k) - P_{nm}^{cross}(k) - [P_{nm}^{cross}(k)] + P_{nm}(k)$ " and insert therefor -- $dP_{nm}(k) = P_n(k) - P_{nm}^{cross}(k) - [P_{nm}^{cross}(k)]^T + P_{nm}(k)$ --.

Signed and Sealed this

Twenty-fourth Day of October, 2006

JON W. DUDAS
*Director of the United States Patent and Trademark Office*